United States Patent Office 3,066,170
Patented Nov. 27, 1962

3,066,170
BORON HYDRIDE DERIVATIVES
Hugh E. Ramsden, Scotch Plains, N.J., assignor to Metal & Thermit Corporation, Woodbridge Township, N.J., a corporation of New Jersey
No Drawing. Filed Mar. 2, 1959, Ser. No. 796,292
11 Claims. (Cl. 260—606.5)

The present invention relates to novel boron hydride (borane) containing materials and to their preparation.

The oxidation of a boron hydride releases large amounts of energy. The complete reaction of stoichiometric mixtures of a boron hydride and oxygen releases approximately fifty percent more energy per pound of boron hydride than does a stoichiometric mixture of a hydrocarbon and oxygen per pound of hydrocarbon. This high-energy release, in conjunction with the very rapid oxidation of boron hydride materials generally, makes the boron hydrides useful fuels. Unfortunately the boron hydrides, per se, are difficult to utilize, being corrosive, highly toxic, etc. A need exists to modify these boron hydride materials so that they may be more easily handled and stored, and yet not decrease their energy release characteristics or to decrease these characteristics in a minimal manner.

It is an object of this invention to provide novel boron hydride-containing materials.

It is another object of this invention to provide a process for producing boron hydride-containing materials useful as high energy materials.

Another object of this invention is to provide modified boron hydride-containing materials in which the material is in the liquid state.

It is still another object of this invention to provide modified boron hydride-containing materials in which the material is in the solid state.

It is still another object of this invention to provide boron hydride-containing materials which are of such a nature that they are compatible with other fuel components, both of the liquid and of the solid types.

Other objects will be apparent to those skilled in the art and will be also more fully developed in the following subject matter of the specification.

In accordance with this invention, there is provided as a composition of matter a boron hydride derivative comprising the addition product of a boron hydride with a vinyl boron material. These are prepared by reacting a boron hydride with a vinyl boron compound. The boron hydride reactant is in such a ratio to the vinyl boron reactant to obtain a final adduct having still available boron to hydrogen linkages providing centers of high energy.

In accordance with certain of its more specific aspects, the novel boron hydride derivatives of this invention consist essentially of the addition product of a boron hydride selected from the class consisting of diborane, tetraborane, pentaborane-9, pentaborane-11, hexaborane, decaborane, and ethyldecaborane, with a boron compound having the formula $Vi_aBR_b$ where $a$ is 1–3, $b$ is 0–2, the sum of $a$ and $b$ being 3, and R is a hydrocarbon radical selected from the class consisting of lower alkyl, phenyl, and benzyl radicals. In this formula, as elsewhere in the specification and claims where convenient, the symbol Vi may be used to denote the vinyl group, $CH_2=CH—$, and thus the formula $Vi_aBR_b$ is equivalent to $(CH_2=CH)_aBR_b$.

Illustrative of the reaction in its most simple form is the reaction of $B_2H_6$ (diborane) with vinyl boron compounds, as follows:

(1) $3B_2H_6 + (CH_2=CH)_3B \rightarrow (B_2H_5CH_2—CH_2)_3B$
(2) $2B_2H_6 + (CH_2=CH)_2BCH_3 \rightarrow (B_2H_5CH_2CH_2)_2BCH_3$
(3) $B_2H_6 + CH_2=CHB(CH_3)_2 \rightarrow B_2H_5CH_2CH_2B(CH_3)_2$ As illustrated, where the proper ratio of the boron hydride is added to a fully vinylated boron molecule, it is possible to obtain a monomer. When the boron is modified by an alkyl group in addition to the vinyl grouping, it is preferably modified by the methyl grouping. This is in accordance with the intention of the invention to provide the minimum hydrocarbon dilution, that is to say, low energy dilution of the energy-rich material consistent with obtaining an easily handled and utilized boron hydride material.

The process is further illustrated by the following series of equations in which a boron hydride (here dihydropentaborane) is added to a vinyl boron material.

(4) $3B_5H_{11} + (CH_2CH)_3B \rightarrow (B_5H_{10}CH_2CH_2)_3B$
(5) $2B_5H_{11} + (CH_2=CH)_2BH \rightarrow (B_5H_{10}CH_2CH_2)_2BH$
(6) $2B_5H_{11} + (CH_2=CH)_2BCH_3$
$\rightarrow (B_5H_{10}CH_2CH_2)_2BCH_3$ Broadly speaking, the invention provides a method for the formation of novel materials containing at least one structural configuration in its molecular formula of the following linkage:

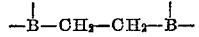

Although the boron may be linked to other boron atoms through ethylene groups, some of the boron has residual high energy linkages to hydrogen. Cyclic structures are entirely possible in the monomeric compounds of this invention. These can be exemplified as follows:

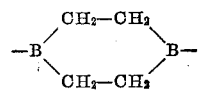

Because of the nature of the reactants and of the final products, as well as their extremely high reactivity, it is not possible to state with any definiteness the final structure obtained by the reaction of the boron hydride and the vinyl boron. Although there are set forth in the specification certain chemical formulations which are attempts to set out the probable course of the reaction for explanatory purposes, this invention is not to be limited by any specific chemical structure designated for either a monomeric product or a polymeric material wherein the polymer is linear, or is cross-linked via boron hydrogen vinyl reactions, or by true ethylenic reactions.

The borane residue adds across the vinyl linkage and may remain intact as the particular borane moiety which is adding. It is also possible that the borane moiety fragments into lesser moieties or accretes. In any event, the boron molecule retains, either alone or in combination with other borons, residual energy-rich boron to hydrogen linkages. This is illustrated as follows:

(7) $3B_2H_6 + (CH_2=CH)_3B \rightarrow (B_2H_5CH_2CH_2)_3B$
(direct)

(8) $6B_2H_6 + (CH_2=CH)_3B \rightarrow (B_4H_9CH_2CH_2)_3B + 3H_2$
(accretion)

(9) $3B_2H_6 + 2(CH_2=CH)_3B \rightarrow 2(BH_2-CH_2CH_2)_3B$
(fragmentation)

It is apparent that where the boron has at least two hydrogen atoms which are active in the addition reaction and where the vinyl boron has at least two vinyl groups, it is possible to form two products in addition to the straight chain monomer. This can be understood by the following equation:

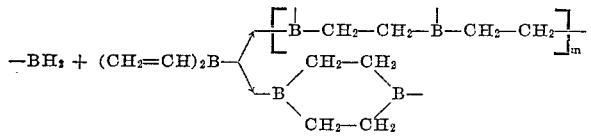

wherein $m$ indicates the particular length of the polymeric chain. It is obvious that the terminal boron atoms are borane containing materials having one or more high-energy boron to hydrogen linkages.

It is also further evident that cross-linking can occur between the polymeric boron chain by reaction of residual hydrogen-boron materials on the polymeric chain with a further molecule of divinyl or trivinyl boron. This can be illustrated as follows:

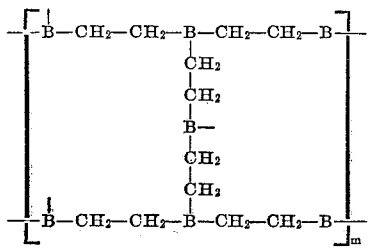

wherein $m$ will designate the length of the polymeric chain. The extent of cross-linking will, of course, determine whether a glassy, liquid or solid product will be obtained, as is usual in polymeric systems.

Where the boron hydride is added to a trivinyl boron, it is possible to have cross-linking occur either (1) as shown above or (2) by way of usual vinyl polymerization in the presence of ultraviolet light or polymerization catalysts. A cross-linked chain of this sort can be exemplified as seen in the following formula:

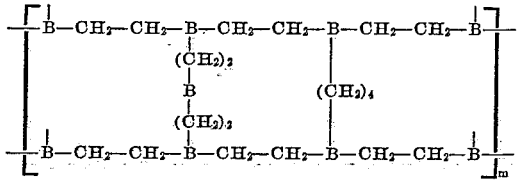

The cross-linking will not necessarily take place on proximate boron atoms, which is illustrated here merely for convenience. Cross-linking of such cyclic structures or polymerization of such cyclic structures can also take place.

The formation of various vinylated and fully vinylated borons are described in co-pending U.S. application Serial No. 671,377, filed July 12, 1957, Patent No. 2,921,954. The only requirement of the boron reactant for use in the process is that the boron be bonded to at least one vinyl group. The other valences of the boron may be bonded to other vinyl groups or to other desired groups, dependent on the desired properties of the final product. To maintain low hydrocarbon dilution, the methyl and ethyl substitutions are preferred. However, larger groups such as phenyl, benzyl and octyl may be used to obtain desired properties at the expense of the high-energy release characteristics.

The boron hydrides which can be utilized as a reactant in the present invention include diborane, tetraborane, pentaboranes (9 and 11), hexaborane, decaborane, and also ethyldecaborane. In practice, it is easier to use the pentaboranes and decaboranes. Mixtures of the enumerated boranes may be used as well as the individual boranes. The alkyl boron hydrides may also be used. The alkyl-substituted diboranes are easily prepared by allowing a mixture of diborane and a trialkylborane ($BR_3$) to come to equilibrium at room temperature. The mixture is then frozen and carefully fractionated at low temperatures in a vacuum system to get a series of alkyl substituted derivatives which can be utilized as reactants in the present invention. Since the existence of pure alkyl diboranes at room temperature is relatively transient, the equilibrium mixture of diborane and a trialkylborane can be reacted in situ, without fractionation with a vinyl boron material as discussed above to give the novel products of this invention.

The number and kind of substituents on the vinyl boron reactant and the particular borane is dependent on the nature of the final boron-ethylene-boron product desired. The choice will be dependent on the amount of energy-rich bonds desired in the product together with the other physical and chemical properties desired. The product may be varied to achieve the most desirable energy level consistent with compatibility in the fuel system contemplated.

In the practice of this invention, the boron vinyl compound and the boron hydride reactant are kept together without exposure to extraneous matter for relatively long reaction periods at a temperature which may vary greatly, dependent on the reactants utilized. Generally, the reaction is at temperatures between about $-50°$ C. to about $100°$ C. For the more stable boron materials, e.g., decaborane, it might be substantially higher. It is preferred to use stoichiometric quantities (based on the products desired) of vinyl boron reactant and the boron hydride reactant. Non-reactive solvents such as tetrahydrofuran, hydrocarbons, or mixtures thereof may be advantageously employed.

When the reaction is completed, the product may be utilized by removing in vacuo excess vinyl boron, solvent and unreacted boron hydride. The residual liquid or solid boron-ethylene-boron product is then suitable for its intended use without further purification.

For the purpose of giving those skilled in the art a better understanding of the invention, the following illustrative examples are given.

EXAMPLES

Example 1: Separately, 3 moles of vinylmagnesium chloride is added to 1 mole of boron trichloride and tetrahydrofuran to form trivinylboron. To the final Grignard reaction mixture is added a 50% by volume of n-pentane and the precipitated magnesium chloride salts are removed by filtration. To 1 mole of a 10% by weight solution of trivinylboron prepared as above and in a 1 to 1 mixture of tetrahydrofuran and pentane, is added 3 moles of diborane at room temperature. The reaction mixture is then brought to a temperature of about 65° C. for a period of 24 hours. All volatile materials are removed by distillation at a temperature of 50–55° C. at 0.01 mm. The resulting residue is a thick viscous pasty mass.

Example 2: In a process entirely analogous to that of Example 1, there is utilized tetraborane, pentaborane, dihydropentaborane, hexaborane, and decaborane to produce in each case a glassy solid adduct.

Example 3.

$$2B_5H_{11} + (CH_2=CH)_3B$$

Trivinylboron in 10% by weight of 50:50 tetrahydrofuran and pentane mixture is prepared as in Example 1. To this is added 2 moles of dihydropentaborane and the resultant reaction kept at 57–62° C. for 27 hours. Thereafter, the resultant reaction mixture is exposed to ultraviolet light for a period of 5 hours further. Volatiles are removed by distillation at up to 60° C. at 0.01 mm. vacuum. The final product is a tannish, amorphous solid mass.

Example 4:

$$3B_2H_6 + (CH_2=CH)_3B$$

This experiment is run identical with experiment No. 1 except that it is in the presence of ultraviolet light. The resultant product is an amorphous tannish powder.

Example 5:

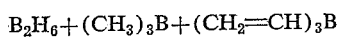

$$B_2H_6 + (CH_3)_3B + (CH_2=CH)_3B$$

A solution of trivinylboron in tetrahydrofuran and pentane mixture is prepared as in Example 1. Separately 1 mole of diborane and 1 mole of trimethylboron are permitted to equilibrate in tetrahydrofuran for a period of 1 week. The trivinylboron prepared in situ is added with the equilibrated mixture of diborane and trimethylboron at room temperature and then the reaction product is heated to 60° C. for a period of 30 hours. Removal of volatiles is effected by distillation at up to 60° C. at evacuation of up to 0.01 mm. The resultant product is a waxy glassy material.

Those compounds of this invention which are liquid are useful as liquid propellants themselves in special situations. They are also useful as direct blends with hydrocarbon fuels for reaction motors or for jets. The solid fuel compositions utilize the products of this invention alone or as a blend. A binder is used, when desired. Regulators and oxidizers are usually present. The oxidizers are usually the nitrates or percholates of potassium, sodium, magnesium, lithium, ammonium, etc. The proportion of fuel polymer to oxidizer is usually in the ratio of about one to four to vary performance. The solid fuels or blends are used as fuels for rockets, high pressure jets for cutting, oil well perforation, drilling operations, underwater propulsion devices, and, in general, where a high-energy, short-duration impulse is required.

As many embodiments of this invention may be made without departing from the spirit and scope thereof, it is to be understood that the invention includes all such modifications and variations as come within the scope of the appended claims.

What is claimed is:

1. As a composition of matter, a boron hydride derivative consisting essentially of the addition product of a boron hydride selected from the class consisting of diborane, tetraborane, pentaborane-9, pentaborane-11, hexaborane, decaborane, and ethyldecaborane, with a boron compound having the formula $Vi_aBR_b$ where $a$ is 1–3, $b$ is 0–2, the sum of $a$ and $b$ being 3, Vi in the above formula is the vinyl group, and R is a hydrocarbon radical selected from the class consisting of lower alkyl, phenyl, and benzyl radicals.

2. A composition according to claim 1 wherein R is the methyl radical.

3. A composition according to claim 1 wherein the ratio of boron hydride residues to vinyl groups is about 1:1.

4. A composition according to claim 1 wherein the ratio of boron hydride residues to vinyl groups is about 1:2.

5. A composition according to claim 1 wherein the boron compound is trivinylboron.

6. A composition according to claim 1 wherein the addition product is polymeric.

7. A process for preparing a boron hydride derivative which comprises reacting a boron hydride selected from the class consisting of diborane, tetraborane, pentaborane-9, pentaborane-11, hexaborane, decaborane, and ethyldecaborane, with a boron compound having the formula $Vi_aBR_b$ where $a$ is 1–3, $b$ is 0–2, the sum of $a$ and $b$ being 3, Vi in the above formula is the vinyl group, and R is a hydrocarbon radical selected from the class consisting of lower alkyl, phenyl, and benzyl radicals.

8. A process according to claim 7 wherein the boron compound is trivinylboron.

9. A process according to claim 7 wherein the molar ratio of boron hydride groups to vinyl groups of the boron compound is about 1:1.

10. A process according to claim 7 wherein the molar ratio of boron hydride groups to vinyl groups of the boron compound is about 1:2.

11. A process for preparing a boron hydride derivative comprising preparing a tetrahydrofuran solution of a boron compound having the formula $Vi_aBR_b$ where $a$ is 1–3, $b$ is 0–2, the sum of $a$ and $b$ being 3, Vi in the above formula is the vinyl group, and R is a hydrocarbon radical selected from the class consisting of lower alkyl, phenyl, and benzyl radicals, and reacting the solution with a boron hydride selected from the class consisting of diborane, tetraborane, pentaborane-9, pentaborane-11, hexaborane, decaborane, and ethyldecaborane, the molar ratio of boron hydride compound to said boron compound being at least 1:1.

References Cited in the file of this patent

Stone et al.; J. Chem. Soc. (London) pp. 2755–9 (1950).

Parsons et al.: J. Am. Chem. Soc., vol. 76, p. 1710 (1954).